3,470,125
PRODUCTION OF POLYMER DISPERSIONS
Wolfgang Sliwka, Weinheim, and Manfred Gellrich, Ludwigshafen (Rhine), Germany, assignors to Badische Anilin- & Soda-Fabrik Aktiengesellschaft, Ludwigshafen (Rhine), Germany
No Drawing. Continuation of application Ser. No. 523,021, Jan. 26, 1966. This application Feb. 15, 1968, Ser. No. 705,856
Claims priority, application Germany, Feb. 5, 1965, B 80,384
Int. Cl. C08f 1/13, 3/56
U.S. Cl. 260—29.6  2 Claims

ABSTRACT OF THE DISCLOSURE

An improved process for the polymerization of vinyl esters in aqueous emulsion in the presence of catalysts and of a modified polyvinyl alcohol. The improvement consists in using as the modified polyvinyl alcohol a saponification product of a copolymer derived from 90 to 99.9% by weight of a vinyl ester of an aliphatic monocarboxylic acid having one to three carbon atoms and 0.1 to 10% by weight of a vinyl ester of an aliphatic saturated monocarboxylic acid having four to twenty carbon atoms whose carboxylic group is in α-position to a tertiary carbon atom.

---

This application is a continuation of application Ser. No. 523,021, filed Jan. 26, 1966, and now abandoned.

This invention relates to a process for the production of polymer dispersions by polymerizing olefinically unsaturated compounds which are practically insoluble in water or at the most partly soluble in water, in aqueous phase in the presence of catalysts and modified polyvinyl alcohol as a protective colloid.

It is known that olefinically unsaturated compounds may be polymerized in aqueous phase in the presence of polyvinyl alcohols as dispersing agents having protective colloid properties. It is also known that polyvinyl alcohols may be used for this purpose which have been prepared by partial saponification of polyvinyl acetate, by saponification of copolymers of polyvinyl acetate and vinyl ethers or by partial acetalization of polyvinyl alcohol. The polyvinyl dispersions prepared therewith are not however satisfactory in every respect. If polymerization be carried out exclusively in the presence of these protective colloids, i.e. with out the use of additional emulsifiers, polymer dispersions are formed which have relatively coarse particles, exhibit poor film-forming properties and yield cloudy dull films. The pigment binding power of such polymer dispersions and the waterproofness of films prepared therefrom are also unsatisfactory. If polyvinyl alcohol or the modified polyvinyl alcohols hitherto known be used in conjunction with additional emulsifiers, for example soaps or surface-active ethylene oxide reaction products, this usually results in a lowering of the viscosity or a marked intrinsic viscosity of the polymer dispersion. The tendency of the dispersions to froth is also increased.

The object of the invention is to prepare dispersions of vinyl ester polymers which exhibit the said disadvantages at least to a far less extent if at all.

We have found that aqueous dispersions of vinyl ester polymers having advantageous properties can be prepared by polymerization of vinyl esters in aqueous phase in the presence of catalysts and of modified polyvinyl alcohols under conventional conditions by using as the modified polyvinyl alcohol a saponification product of a copolymer of 90 to 99.9% by weight of a vinyl ester of an aliphatic monocarboxylic acid having one to three carbon atoms and 0.1 to 10% by weight of a vinyl ester of an aliphatic saturated monocarboxylic acid whose carboxylic group is in α-position to a tertiary or quaternary carbon atom. Vinyl esters of lower fatty acids having one to three carbon atoms, such as vinyl formate, vinyl acetate and vinyl propionate, and mixtures of these esters, are suitable as vinyl esters for the copolymer by whose saponification the modified polyvinyl alcohols to be used according to this invention may be prepared.

The vinyl esters of aliphatic saturated monocarboxylic acids whose carboxylic group is in α-position to a tertiary or quaternary carbon atom include the vinyl esters of monocarboxylic acids of appropriate constitution having four to about twenty carbon atoms, for example vinyl pivalate, vinyl-2,2,4,4-tetramethylvalerate or mixtures of the same. It is preferred to use the vinyl esters of long chain monocarboxylic acids having the said structure, particularly those which ocntain six to twelve carbon atoms in the chain and which are obtained for example by vinylation of branched carboxylic acids such as are formed in the reaction of olefins with carbon monoxide and water in the presence of strong mineral acids.

The copolymerization of the vinyl esters of lower fatty acids with the vinyl esters whose carboxylic groups are in α-position to a tertiary or quaternary carbon atom may be carried out in known manner, for example as bulk polymerization, solution polymerization or granular polymerization with radical or ionic catalysts or light as polymerization initiator. The copolymers should contain 0.1 to 10% by weight, preferably 0.5 to 5% by weight, of vinyl ester units whose carboxyl groups are in α-position to a tertiary or quaternary carbon atom.

Saponification (which is to be understood as also including transesterification) of the said copolymers into the modified polyvinyl alcohols may be carried out in known manner with acid or alkaline catalysts, such as sodium methylate, sodium hydroxide, sulfuric acid or p-toluenesulfonic acid, in the presence of lower alcohols, such as methanol, under conditions under which polyvinyl acetate is entirely saponified. The resultant modified polyvinyl alcohols are soluble in water and the turbidity point of their 1% aqueous solution should be above 60° C., preferably above 80° C. Modified polyvinyl alcohols whose 1% aqueous solutions are compatible without turbidity at 80° C. with up to three parts of volume, particularly 10 to 100 parts by volume, of a 10% aqueous ammonium sulfate solution, are particularly suitable. The production of the polyvinyl alcohols is not the subject of the present invention.

For the production of polymer dispersions according to this invention by polymerization of vinyl esters in aqueous phase in the presence of catalysts and modified polyvinyl alcohols, these protective colloids are in general used in amounts of about 1 to about 10% by weight, preferably 2 to 6% by weight, on the amount of monomers if no additional emulsifier is used. If additional emulsifiers are used, such as soaps or ethylene oxide adducts, even smaller amounts of protective colloids are required.

Vinyl esters of aliphatic monocarboxylic acids having two to eighteen and particularly two to twelve carbon atoms are particularly suitable as vinyl esters which can be polymerized in the presence of the said protective colloids. Examples are vinyl butyrate, vinyl pivalate, vinyl-2,2,4,4-tetramethylvalerate, vinyl stearate and particularly vinyl acetate and vinyl propionate. The said monomers may be used alone mixed with each other or mixed with other conventional monoolefinically unsaturated monomers which are practically insoluble or at the most partly soluble in water, for the production of the polymer dispersions.

Examples of conventional monoolefinically unsaturated monomers which may be used with advantage in amounts of 1 to 49%, particularly 4 to 25%, by weight on the total amount of monomers, are vinyl chloride, vinylidene chloride, esters of monohydric aliphatic alcohols having one to eight, particularly one to four, carbon atoms and olefinically unsaturated carboxylic acids having three to five carbon atoms, particularly the acrylates and methacrylates, such as methyl methacrylate, ethyl acrylate, n-butyl acrylate, tertiary-butyl acrylate or 2-ethylhexyl acrylate.

In some cases it is advantageous to coemploy strongly polar hydrophilic monomers, such as acrylic acid, methacrylic acid, crotonic acid, acrylamide, N-methylolmethacrylamide, or vinylsulfonic acid, in amounts of 0.1 to 10%, and particularly 0.1 to 5%, by weight of the total amount of monomers in the production of the polymer dispersions according to this invention.

Suitable catalysts for polymerization in aqueous medium under conventional polymerization conditions, for example at temperatures of 40° to 100° C., are the known catalysts and catalyst systems, as for example potassium persulfate or hydrogen peroxide. Other known emulsifiers may be used in the usual amounts together with the modified polyvinyl alcohols used according to this invention, for the polymerization, but in some cases there is no advantage.

Polymer dispersions which result from the process according to this invention have various advantages over dispersions prepared with prior art protective colloids. They are very finely dispersed, very highly viscous and have an excellent pigment binding power. When applied to substrates they form clear, glossy and waterproof films which exhibit a low water absorption. The polymer dispersions are therefore particularly suitable for the production of paints, but may also be used for example for coating paper, for finishing textiles, for improving cement and as adhesives or glues.

The invention is illustrated by the following examples in which the parts and percentages (unless otherwise stated) are by weight. Parts by volume bear the same relation to parts by weight as the liter to the kilogram. The K-values given are determined by the method of H. Fikentscher, Cellulosechemie 13 (1932) 58.

Example 1

(a) Production of the modified polyvinyl alcohol.— A mixture of 3,000 parts of a 0.17% aqueous polyvinyl alcohol solution, 2,500 parts of vinyl acetate, 50 parts of vinyl-2,2,4,4-tetramethylvalerate and 22.5 parts of dibenzoyl peroxide is heated to 65° C. while stirring. After two hours, the temperature is kept at 90° C. until no further reflux takes place. The K-value of the granular polymer thus prepared is 63 (1% solution in cyclohexanone).

870 parts of a 30% solution in methanol of the copolymer is allowed to flow while stirring into a boiling solution of 2.6 parts of sodium methylate in 1,100 parts of methanol in the course of three hours. The mixture is then kept at 65° C. for one hour. During saponification, the methyl acetate formed is distilled off azeotropically. The modified polyvinyl alcohol obtained is separated, washed with methanol and dried at 40° C. in vacuo. The outflow time of a 10% aqueous solution from a Ford beaker having a nozzle of 4 mm. is 100 seconds at 20° C. 30 parts by volume of a 1% solution will tolerate the addition at 80° C. of 1.3 parts by volume of a 10% aqueous ammonium sulfate solution up to permanent turbidity. The ester number 7 is determined in aqueous solution.

(b) Production of the polymer dispersion.—300 parts of a 10% aqueous solution of modified polyvinyl alcohol prepared according to (a) is adjusted with formic acid to a pH value of 3, 200 parts of water and 0.005 part of iron ammonium sulfate are added and the whole is heated to 80° C. 2 parts of 30% aqueous hydrogen peroxide is added to the mixture and then 500 parts of vinyl propionate in the course of ninety minutes with constant stirring. Reaction is then allowed to continue for another hour at 80° to 90° C.

A pasty polymer dispersion free from coagulate is obtained which yields a smooth, clear and glossy film. The dispersion has a solids content of 52%, a viscosity of 129 poises (Epprecht rheometer, measuring body C, stage II) and the particles size in the dispersion is about 0.5 micron.

Comparative test A.—A partly saponified polyvinyl acetate which has an ester number of 129 and which has been prepared by a prior art method is used as protective colloid. The outflow time of a 10% aqueous solution from a Ford beaker with a 4 mm. nozzle is 149 seconds at 20° C. 30 parts by volume of a 1% aqueous solution of the protective colloid will tolerate at 80° C. the addition of 2.3 parts by volume of a 10% aqueous ammonium sulfate solution up to permanent turbidity.

A polyvinyl propionate dispersion is prepared in the presence of this protective colloid according to the directions given in Example 1(b). The voscosity of the resulant 48% dispersion is 63 poises (Epprecht rheometer, measuring body C, stage II), the particle size in the dispersion is 0.5 to 0.7 micron. A film formed with the dispersion is clear but has a slightly grained surface.

Comparative test B.—Polyvinyl acetate is subjectd to practically complete acid saponification in a conventional way with an addition of 2% of n-butyraldehyde. The ester number of the resultant modified polyvinyl alcohol is 8 and the outflow time of a 10% aqueous solution of the product from a Ford beaker having a 4 mm. nozzle is seventy seconds at 20° C. 30 parts by volume of a 1% aqueous solution of the modified polyvinyl alcohol will tolerate at 80° C. the addition of 0.5 part by volume of a 10% aqueous ammonium sulfate solution up to permanent turbidity.

A polyvinyl propionate dispersion is prepared according to the description in Example 1(b) using this protective colloid. The resultant 52% aqueous dispersion has a viscosity of 23 poises (Epprecht rheometer, measuring body C, stage II) and when applied to a substrate gives a slightly cloudy film. The particle size in the dispersion is 0.7 to 1.5 microns.

Testing dispersions of Example 1 and comparative tests A and B for their pigment binding power.—20 parts of lithopone is made into a paste with 8 parts of a 0.6% aqueous ammonium polyacrylate solution and 5 parts of one of the polymer dispersions according to Example 1, comparative test A or comparative test B. The pigment volume concentration is about 67%. The resultant pigment pastes are applied to cardboard in a thickness of about 100 microns, allowed to dry for twenty hours at 25° C. and then lightly brushed under uniform pressure. The coatings with the comparative dispersions A and B as binder are completely rubbed off after only six and five strokes of the brush, respectively. In contrast to this, the coating with the polymer dispersion of Example 1 prepared according to this invention is completely undamaged after ten strokes of the brush and the brush liquid, stripped off onto a black background, contains practically no pigment.

We claim:
1. In a process for the production of an aqueous dispersion of a vinyl ester polymer by polymeriaztion of a vinyl ester in aqueous phase in the presence of a polymerization catalyst and a modified polyvinyl alcohol the improvement which comprises using as modified polyvinyl alcohol a partial saponification product of a copolymer of 90 to 99.9% by weight of a vinyl ester of an aliphatic monocarboxylic acid having one to three carbon atoms and 0.1 to 10% by weight of a vinyl ester of an aliphatic saturated monocarboxylic acid having four to twenty carbon atoms whose carboxylic groups is in α-position to a tertiary or quaternary carbon atom.

2. The improvement as claimed in claim 1 which comprises using a partial saponification product of a copolymer of 95 to 99.5% by weight of a vinyl ester of an aliphatic monocarboxylic acid having one to three carbon atoms and 0.5 to 5% by weight of a vinyl ester of an aliphatic saturated monocarboxylic acid having four to twenty carbon atoms whose carboxylic group is in α-position to a tertiary or quaternary carbon atom.

References Cited

UNITED STATES PATENTS 2,310,780  2/1943  Hanford et al. _____ 260—85.7
3,010,929  11/1961  Jones.

MURRAY TILLMAN, Primary Examiner

W. J. BRIGGS, SR., Assistant Examiner

U.S. Cl. X.R.

260—80.8, 80.73, 91.3, 85.7, 86.3, 87.1, 89.1, 875, 899